US009487108B2

(12) United States Patent
Pleskot et al.

(10) Patent No.: US 9,487,108 B2
(45) Date of Patent: Nov. 8, 2016

(54) MOTOR VEHICLE SEAT, MOTOR VEHICLE AND ASSOCIATED METHOD

(75) Inventors: Andrzej Pleskot, Seeheim (DE); Johannes Barzen, Pfaffenhofen (DE); Eckhard Nock, Wolnzach (DE); Norbert Hertling, Munich (DE)

(73) Assignees: GM Global Technology Operations LLC, Detroit, MI (US); Lear Corporation Inc., Southfield, MI (US)

( * ) Notice: Subject to any disclaimer, the term of this patent is extended or adjusted under 35 U.S.C. 154(b) by 0 days.

(21) Appl. No.: 14/236,880

(22) PCT Filed: Jun. 4, 2012

(86) PCT No.: PCT/EP2012/002358

§ 371 (c)(1), (2), (4) Date: Feb. 3, 2014

(87) PCT Pub. No.: WO2012/163549

PCT Pub. Date: Dec. 6, 2012

(65) Prior Publication Data

US 2014/0152067 A1 Jun. 5, 2014

Related U.S. Application Data

(60) Provisional application No. 61/494,941, filed on Jun. 9, 2011, provisional application No. 61/492,866, filed on Jun. 3, 2011.

(51) Int. Cl.

*B60N 2/00* (2006.01)
*B60N 2/22* (2006.01)
*B60N 2/235* (2006.01)

(52) U.S. Cl.

CPC ............... *B60N 2/2218* (2013.01); *B60N 2/22* (2013.01); *B60N 2/2356* (2013.01); *Y10T 29/49826* (2015.01)

(58) Field of Classification Search

CPC ............................... B60N 2/235; B60N 2/682
USPC ............................ 297/354.12, 367 R, 452.18
See application file for complete search history.

(56) References Cited

U.S. PATENT DOCUMENTS

| | | | | |
|---|---|---|---|---|
| 3,271,811 | A | 9/1966 | Flodell | |
| 6,336,679 | B1 * | 1/2002 | Smuk | 297/378.12 |
| 6,543,855 | B2 * | 4/2003 | Bruck | 297/440.21 |
| 7,021,715 | B2 * | 4/2006 | Umezaki | 297/367 R |
| 7,503,099 | B2 * | 3/2009 | Pejathaya | 297/374 |
| 8,668,272 | B2 * | 3/2014 | Sankaran et al. | 297/452.18 |
| 2006/0012232 | A1 * | 1/2006 | Coughlin et al. | 297/367 |
| 2009/0218870 | A1 * | 9/2009 | Kawamura et al. | 297/367 R |
| 2011/0006575 | A1 | 1/2011 | Sankaran | |
| 2011/0089736 | A1 * | 4/2011 | Seibold et al. | 297/367 R |

* cited by examiner

*Primary Examiner* — Jose V Chen

(74) *Attorney, Agent, or Firm* — John A. Miller; Miller IP Group, PLC

(57) ABSTRACT

The subject matter of the present invention concerns a motor vehicle seat (10), especially a folding motor vehicle seat (10), comprising a backrest structure (210) and a seat structure (310) hinged to the backrest structure (210) by an adjustment device (100), wherein the adjustment device (100) has at least one adjustable fitting device (150) with a backrest section (16) for connecting to the backrest structure (210) and a seat section (18) for connecting to the seat structure (310), wherein the backrest section (16) and the seat section (18) are arranged on different sides of the backrest structure (210) and/or the seat structure (310). Moreover, the subject matter of the present invention concerns a method for this.

20 Claims, 12 Drawing Sheets

MOTOR VEHICLE SEAT, MOTOR VEHICLE AND ASSOCIATED METHOD

Figure 1:
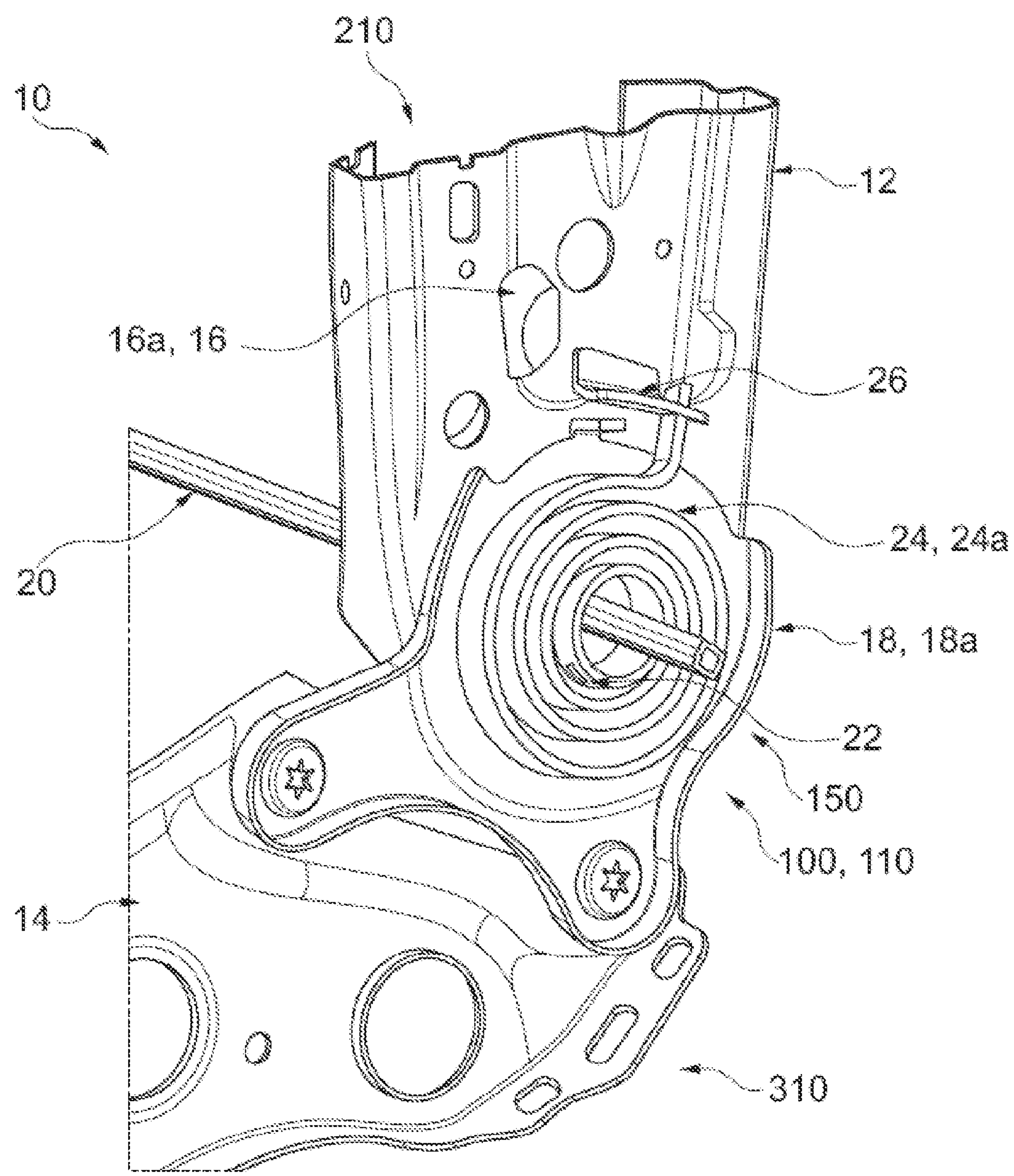

The invention concerns a motor vehicle seat according to the preamble of claim 1.

The invention also concerns a motor vehicle according to the preamble of claim 14.

Furthermore, the invention concerns a method for making a motor vehicle seat according to the preamble of claim 15.

Motor vehicles with seats are known from the prior art, wherein a backrest or a backrest piece or the position of the backrest is adjustable in relation to a seat piece, in particular, it can be folded up and down. The adjustment is done by a lever mechanism arranged on the seat or some other activating device situated there. Continuous adjustment processes are known, such as those using actuators, and discontinuous adjustment processes, that is, stepwise adjustments, for example those using mechanical solutions. In the case of mechanical adjustments, locking or detent features are locked and released for the adjusting and locking. This is traditionally done by a lever, through which a force is transmitted to an adjustable fitting. A proportional force transmission then occurs, that is, a force being transmitted increases with the lever's path, or in the case of a rotary movement the torque increases with the angle of rotation. Thanks to intermediate positions of the adjustable fittings, an adjustment is even possible when the fitting is not completely unlocked. The moving into such intermediate positions can result in unwanted side effects, such as noise or increased wear and tear in the adjustment process. Levers for unlocking the locking mechanism and thus the adjustment device usually sit directly on a rotary axis of the adjustment device. So that the backrest does not spontaneously fold down toward the floor when released and to make it easier to adjust the backrest position, the known solutions have a spring or the like. The spring acts to bias the backrest in a folding direction toward the seat piece. The spring is preferably arranged in the area of the rotary axis between seat piece and backrest.

From DE 38 00 924 C2 there is known a vehicle seat with an adjustment device for a backrest, consisting of a stationary bearing block, a swivel arm mounted movably on the bearing block and able to be fixed in arbitrary angled positions by means of a locking mechanism, while the adjustment device is covered by a cover piece toward the user of the seat, being characterized in that the bearing block is fastened to the seat piece and the other parts of the adjustment device are arranged inside the backrest and connected to it, and the cover piece is firmly joined to a part of the adjustment device and has a slot in which an upwardly projecting region of the bearing block fits when the backrest is folded forward.

The adjustment device is configured on the outside and at the side of the motor vehicle, and thus it occupies additional sideways or lateral structural space.

Therefore, one problem of the present invention is to create a solution of smaller size. In particular, one problem of the present invention is to create a motor vehicle seat, a motor vehicle, and a method for this, in which a smaller structural solution is realized.

This and other problems are solved starting from a motor vehicle seat according to claim 1, a motor vehicle according to claim 14 and a method according to claim 15 in connection with the features thereof. Advantageous modifications of the invention are indicated in the dependent claims.

The invention includes the technical teaching that, in a motor vehicle seat, especially a folding motor vehicle seat, comprising a backrest structure and a seat structure hinged to the backrest structure by an adjustment device, wherein the adjustment device has at least one adjustable fitting device with a backrest section for connecting to the backrest structure and a seat section for connecting to the seat structure, wherein the backrest section and the seat section are arranged on different sides of the backrest structure and/or seat structure. The backrest structure and/or the seat structure each have an inner side and an oppositely oriented outer side. The outer side points axially in the direction of the edge of the motor vehicle seat. The inner side points in the opposite direction, i.e., axially toward the interior of the motor vehicle seat.

An adjustment device according to the invention comprises a locking mechanism for adjusting a motor vehicle seat. In particular, the adjustment device is configured as a discontinuous adjustment device for adjusting a backrest position of the motor vehicle seat. In another embodiment, the adjustment device is configured as a continuous adjustment device. In yet another embodiment, the adjustment device or the locking mechanism comprises at least one adjustable fitting, which is connected by at least one adapter unit to a seat piece or the seat structure and a backrest or backrest structure that can be adjusted, especially folded, relative to the seat piece, in order to lock and/or release an adjustment of the backrest relative to the seat piece. Furthermore, the locking mechanism in one embodiment comprises at least one back force element cooperating with the backrest, the backrest structure and/or another structural part fixed to the backrest structure to apply force to the backrest at least in a releasing state of the adjustment device or the locking mechanism. The back force element in one embodiment is arranged on and/or adjacent to an inner side, that is, a side not pointing outward to one side of the locking mechanism. In another embodiment, the back force element is arranged on an opposite side, i.e., on an outer side.

The motor vehicle seat comprises a backrest or a backrest piece, more generally a backrest structure and a seat piece or more generally a seat structure. The backrest structure and the seat structure are joined together adjustably via the adjustment device. The adjustment device has a rotary axis around which the backrest structure can be swiveled or folded relative to the seat structure, so that an angle can be adjusted between the seat structure and the backrest structure according to what the user desires. In order to lock the backrest structure in a desired position, the adjustment device has at least one locking mechanism. Preferably, a locking mechanism is provided on each side of the motor vehicle seat or adjustment device.

An adjusting of the backrest structure or the backrest piece is done by applying force to the backrest structure. The backrest structure is preferably prestressed, so that a prestressing force acts in the direction of an upright seat position and against a swiveled back position. In order to swivel the backrest, a force is exerted preferably by a user sitting on the seat, preferably by leaning or pressing against the backrest structure. To prevent an unintentional moving of the backrest structure, the adjustment device has the locking mechanism to prevent unintentional movement. The locking mechanism is preferably configured as an adjustable fitting device, in which two adjustable fitting parts cooperate with each other. These are released for a movement, so that the seat can be adjusted. The adjustment device comprises the adjustable fitting device. When locked, the two adjustable fitting parts are in engagement. To enable a movement, the adjustable fitting parts are moved apart, so that they are no longer in engagement. The force or movement required for this is transmitted by a force transmission mechanism. During the relative movement of the two adjustable fitting parts, especially when moved apart, there are various intermediate positions during the moving between the two end positions or end states—locking and release.

In some of these intermediate positions a movement is possible even though the adjustable fitting parts are still in slight engagement. In order to move apart the adjustable fitting parts, the force transmission mechanism is provided, by which a force can be transmitted at least to the adjustable fitting device for the locking and unlocking. The force results accordingly in a relative movement of the adjustable fitting parts. In order to adjust a force that is transmitted via the force transmission mechanism to the adjustable fitting device so that a movement is possible only when the adjustable fitting parts are completely moved apart, a force transmission mechanism is provided. The force transmission mechanism is designed to perform more quickly and with a perceptible feedback to the user the state in which the adjustable fitting parts are completely removed from each other and a movement is performed without contact of the adjustable fitting parts.

The locking mechanism is arranged preferably in the area of the two ends of the rotary axis, which is preferably formed by a transmission unit. The transmission unit is configured as a rotary axis, for example, a rotary axis or rotary shaft with a rotationally symmetrical cross section and/or with a rotationally symmetrical cross section at least for a portion, by which the backrest can be rotated toward the seat piece. In order to lock or release the rotating or folding of the backrest toward the seat piece, the locking mechanism comprises the adjustable fitting. To prevent the backrest from unintentionally falling backward when the adjustable fittings are released, the back force element is provided. When the locking mechanism is released, the back force element applies a force to the backrest structure so that it does not fold back or down, but instead is prestressed in a folding direction toward the seat piece or the seat structure. The back force element is arranged in the area of the transmission unit. According to the invention, the back force element is arranged on an outer side of the locking mechanism.

The adjustment device, more precisely the adjustable fitting device, has a backrest section for connection to the backrest structure. Moreover, the adjustment device has a seat section for connection to the seat structure. The seat section is fixed at one side or one end to the seat structure. The backrest section is preferably fixed at one side or end to the backrest structure. The other respective sides or ends cooperate with the backrest section and the seat section. That is, the cooperating sides can be brought into engagement with each other, so that the adjustment device is locked and a folding of the backrest structure toward the seat structure is not possible. The engagement can also be canceled once more, so that a folding is made possible. In one embodiment, the adjustment device is configured as an adjustable fitting device. Accordingly, one adjustable fitting part is configured as a backrest section and the other adjustable fitting part as a seat section. In order to create a space-saving adjustment device, the backrest section and the seat section are arranged on different sides of the backrest structure. In particular, the backrest section and the seat section are formed on opposite sides, for example, on one inner side and one outer side of the backrest structure. The adjustment device extends essentially in an axial or lateral direction. The transmission unit is configured as an axial rotary axis. At its end regions, the adjustable fitting device is configured. Preferably, one adjustable fitting device is configured on each of the two end regions. The backrest section and the seat section are arranged axially adjacent to each other. In order for the adjustable fitting device not to stick out too much at the side, one part of the adjustable fitting device, such as the backrest section, is arranged on one inner side of the backrest structure and the seat section on the opposite outer side.

In this way, the overall locking mechanism is smaller in structure, at least axially, that is, in one dimensional direction of the transmission unit, or also sideways or laterally. Accordingly, the same diaphragm can be used for the adjustment device with discontinuous adjustable fitting or with continuous adjustable fitting as for a continuous adjustable fitting. One or more back force element can be provided. The back force element in one embodiment is coupled directly to the backrest. In another embodiment, the back force element is coupled indirectly to the backrest, for example, via an adapter, an adapter unit, or the like. The back force element is preferably arranged on or near a side pointing outward, that is, a side pointing laterally outward.

In one embodiment, the backrest section has a backrest adapter, with which the adjustment device is or can be fixed to the backrest structure. The backrest adapter is preferably arranged on an inner side of the backrest structure. The backrest structure has an inner side and an outer side pointing in the opposite direction. The sides are formed by corresponding surfaces. In order to connect the locking mechanism to the motor vehicle seat, the locking mechanism has the backrest adapter. Preferably, the adjustment device comprises an adapter unit with at least one upper adapter element or a backrest adapter that is coupled to the backrest. In one embodiment, the adapter unit has a lower adapter element or a seat adapter. With this lower adapter element, the locking mechanism is coupled to the seat piece or the seat structure. The adapter elements are coupled together and able to turn about the rotary axis, so that the backrest can be folded toward the seat piece via the adapter unit. Preferably, the back force element cooperates with at least one adapter element. In this way, a force application is realized that is close to the transmission unit. Accordingly, it is provided that the adapter unit has an upper adapter element, a backrest adapter element or the backrest adapter in short, which is connected to the backrest and the adjustable fitting. The backrest adapter element or the upper adapter element is coupled to the backrest structure.

In another embodiment, the seat section has a seat adapter, with which the adjustment device is or can be fixed to the seat structure. Accordingly, in one embodiment, the adapter unit has a lower adapter element, a seat adapter element or the seat adapter for short, which is connected to the adjustable fitting and the seat piece. The lower adapter element is fixed to the seat piece or the seat structure. The back force element cooperates with the backrest adapter element and/or the seat adapter element. In yet another embodiment, the back force element has at least one spring mechanism. In one embodiment, the back force element is configured as a spring mechanism. Preferably, the spring mechanism is configured as a torsion spring, a spiral spring, or the like.

Yet another embodiment calls for the spring mechanism being secured by at least one part and/or one end on the backrest adapter element or upper adapter element. In order to cooperate with the backrest, the spring mechanism is secured by at least one end to the backrest adapter element. Accordingly, the spring mechanism moves along with the movement of the backrest or the backrest adapter element. The securing is done with appropriate connection means.

One embodiment also has the spring mechanism secured by at least another part or another end to the seat piece and/or the seat adapter element or the lower adapter element. In this way, the spring mechanism is also secured to the seat piece. The seat piece in one embodiment is arranged unable to turn, at least relative to the rotary axis, so that the seat piece or the seat adapter element or lower adapter element serves as a support or abutment for the back force element or the spring mechanism.

In another embodiment, at least one corresponding part of the spring mechanism has a connection element for the securing. In order to realize a suitable connection to the adapter elements or the backrest and/or the seat piece, at least one connection element is provided. The connection element is fashioned as a hook, for example. Preferable is a connection element as an inner or central hook. This is connected to the upper adapter and/or backrest. For this, the backrest and/or the upper adapter has a corresponding connection means. Preferably, the backrest and/or the adapter has a projection, a recess, or the like, with which the central hook can engage. The spring mechanism is preferably fashioned as a spiral spring. The inner or central end of the spiral spring has the inner or central hook. The movable end of the spiral spring or the connection element of the backrest or the upper adapter, which moves during the adjustment, is thus surrounded by the spring. The outer end of the spiral spring has the outer hook or the outer connection element. This is fastened to a corresponding connection means of the lower adapter or seat piece. This end preferably does not move during an adjusting of the motor vehicle seat.

One embodiment also calls for the backrest structure to have a backrest frame with at least one lateral backrest longitudinal bracing and for the backrest section and the seat section to be arranged on different sides of the backrest longitudinal bracing and/or a seat longitudinal bracing of the seat structure. Preferably, the backrest frame has two parallel spaced backrest longitudinal bracings, which are joined together at their ends like backrest cross bracings. This produces a king of window-frame structure for the backrest frame. The facing sides of the backrest longitudinal bracings constitute the inner side.

Yet another embodiment calls for the seat adapter and the backrest adapter being arranged on different sides of the backrest longitudinal bracing and/or the seat longitudinal bracing. Preferably, the adjustment device has at each end an adjustable fitting and corresponding adapter. The adjustment device extends axially and joins together the two backrest longitudinal bracings or passes through them and/or extends along the backrest cross bracings. For a comfortable adjustment, the ends of the backrest longitudinal bracings facing toward the seat structure are connected to the respective adapter. The backrest adapter is arranged on one side of the backrest longitudinal bracing, for example, the inner side, and the seat adapter, which is also coupled to the seat piece, is arranged on the other side, for example, the outer side. A region in which the two adapter parts cooperate is arranged beneath or through a portion of the backrest longitudinal bracing.

Therefore, another embodiment calls for the backrest section and the Seat section being operatively interconnected, especially in the axial direction. Preferably, the two adapter parts are interconnected by the adjustable fitting parts, a force transmission such as a gearing in general, the adjustable fitting mechanism or other parts of the adjustment device.

In order to enable the backrest structure to fold axially relative to the seat structure, one embodiment calls for the transmission unit to extend essentially in a lateral and/or axial direction. The transmission unit, or rather its rotary axis, thus forms the folding axis for the backrest structure.

Accordingly, it is provided that the seat section and the backrest section are arranged axially neighboring and/or adjacent to each other.

In order to accommodate the two sections in the most space-saving way, in one embodiment it is provided that the backrest longitudinal bracing, especially each backrest longitudinal bracing with which an adjustable fitting device is coordinated, has a holder for arranging the seat section and/or the backrest section. The holder is in the form of an opening, through opening and/or recess. Preferably, the holder is formed at one extreme end of the backrest longitudinal bracing, so that the holder partially encloses the respective section.

Therefore, one embodiment calls for the holder being formed as a terminal recess, by which the backrest longitudinal bracing adjoins the seat section, the backrest section, the transmission unit and/or the adjustable fitting mechanism, especially adjoins it radially. In this way, the backrest longitudinal bracing is easily mounted on the seat section, the backrest section and/or the transmission unit or the adjustable fitting mechanism or vice versa. This enables an easy assembly.

For a space-saving design, one embodiment calls for the holder to be formed complementary in shape to the backrest section, seat section, adjustable fitting mechanism and/or transmission unit being accommodated. For example, the corresponding outer contours can be complementary to each other.

For stabilization, in another embodiment it is called for the backrest frame to have at least one backrest cross bracing adjoining the backrest longitudinal bracing at the side, which is connected to the backrest longitudinal bracing near the holder. In particular, the backrest longitudinal bracing has two backrest cross bracings adjoining the end side. These are preferably joined to the backrest longitudinal bracing and to a parallel-spaced backrest longitudinal bracing to form the frame in the manner of a window frame. The backrest cross bracings are arranged so that they do not interfere with the holder.

Another embodiment calls for the backrest adapter to be connected to the backrest longitudinal bracing at one side, which is connected to the backrest cross bracing, especially to an inner side of the backrest longitudinal bracing. Preferably, the backrest adapter is fixed to the inner side of the backrest longitudinal bracing, especially by a friction fit, a form fit, and/or a bonded fit. In particular, a permanent connection is provided, for example, by welding, gluing, or the like.

In one embodiment, at least one back force element is arranged on one outer side of the backrest adapter. Accordingly, the adjustment device has two locking mechanisms or detent devices that are mirror images of each other. The detent devices are preferably coupled together by a common transmission unit or rotary axis.

Preferably, the adjustment device has two detent devices, one on each side of the motor vehicle seat. The locking mechanisms in one embodiment have a separate locking mechanism. In order for the locking mechanisms to release the adjustment device in synchronized manner, they are linked to each other. In one embodiment, the linkage is in parallel. Preferably, the locking mechanisms are linked in series. Furthermore, a corresponding synchronization is realized by appropriate means for the synchronized opening of the locking mechanisms.

In one embodiment, each locking mechanism has a lever unit, by which the locking mechanism can be activated. The lever unit is firmly fixed to a rotary axis of the locking mechanism. When activated, that is, rotated, the lever unit rotates along with the rotary axis and releases the locking mechanism, so that the backrest or the backrest piece can be adjusted.

Another embodiment of the invention calls for one of the lever units being coupled to the activating mechanism. In order to operate all locking mechanisms by one activating mechanism or activating unit, one of the locking mechanisms is connected, preferably by a lever unit, to the operating or activating mechanism. The operating mechanism is preferably connected by a pull element to the lever unit. The pull element is fashioned as a cable-like element, especially a Bowden cable. For its connection to the operating unit, the lever unit preferably has another lever arm. By the second or additional lever arm, a transmission ratio to the operating unit can be set. In this way, the operating unit can be arranged at a distance from the rotary axis of the locking mechanism, so that the adjustment device can be remotely operated. Preferably, the adjustment device is arranged at least partly in an easily accessible place away from the rotary axis or the seat or the backrest. Preferably the remote-operated adjustment device is arranged to be easily accessible to a person sitting on the seat, especially in an area which can be grabbed. The single operating unit can be used to activate all the locking mechanisms. Since the different locking mechanisms are linked in series, an unlocking characteristic is formed at the operating unit that is superimposed from the individual unlocking characteristics. The superimposing is such or the individual unlocking characteristics are such that the operating unit has a degressive force/distance curve.

The force/distance curve is in particular nonlinear and/or nonproportional, but preferably it is degressive or progressive. The individual lever units can be designed such that, at the moment of decoupling of the adjustable fitting parts, a force/distance curve undergoes a downward deflection, that is, the force required for a further movement decreases and thus a smoother operating unit is achieved.

A further embodiment calls for at least one of the lever units to have a rotary lever able to turn about a rotary axis, by means of which a force, especially a torque, can be transmitted. In this way, a simple force gearing mechanism or force transmission mechanism is realized. In particular, a force gearing mechanism or force transmission mechanism is realized in a structural part. In particular, one embodiment calls for the force gearing mechanism to be integrated in the force transmission mechanism.

The motor vehicle seat in one embodiment is designed as a single seat. In another embodiment, the motor vehicle seat is designed as a bench seat. The bench seat in one embodiment has a divided backrest, which can be adjusted individually and/or jointly by an adjustment device as specified above.

Moreover, the invention encompasses the technical teaching that at least one sitting device for one passenger is provided in a motor vehicle, especially a car, such that the sitting device is configured according to a motor vehicle seat as specified above. For example, the motor vehicle is configured as a sedan, station wagon, coupé, SUV, (mini)bus or the like.

Not least, the invention encompasses the technical teaching that a process for the manufacturing of a motor vehicle seat, especially a motor vehicle seat according to one of the preceding claims 1 to 14, comprising the step of coupling at least one adjustment device to a backrest structure and a seat structure, calls for arranging a backrest section for connection of the adjustment device to the backrest structure on one side of the backrest structure and a seat section for connection of the adjustment device to the seat structure on another side of the seat structure. In particular, the seat adapter and the backrest adapter are arranged on different sides of the backrest longitudinal bracings. Moreover, in one embodiment, at least one back force element is arranged on the locking mechanism. In this case, the back force element is preferably arranged on an outer side of the locking mechanism.

Two spaced apart locking mechanisms of an adjustment device are coupled to the adjustable fitting and/or the transmission unit. A back force element is provided, to make it easier for the user to perform the adjustment. The back force element is coupled to the upper adapter and/or the backrest. For this, a free end of the back force element, configured as a spiral spring, is coupled to the upper adapter or the backrest. The coupling is done by corresponding connection means. Preferably, an internal or central hook element is provided on the spiral spring. On the backrest and/or the upper adapter a corresponding connection means is provided, such as a recess, a projection, or the like. The inner hook element is coupled to the corresponding connection means. The other end of the spiral spring is secured to the lower adapter and/or the seat piece. For this, an external hook element is provided, for example, on the spring. The seat piece and/or the lower adapter has a corresponding recess or a projection. Since the seat piece and/or the lower adapter element preferably do not move during the adjusting, the spring is secured to this end, which preferably lies on the outside. Preferably, the spiral spring is arranged about a rotary axis, that is, surrounding the rotary axis or the transmission unit. The backrest adapter is preferably arranged inside on the backrest longitudinal bracing, in particular, permanently connected to it, for example by welding. The seat adapter is preferably joined to the seat structure on an outer side, for example, by riveting, screwing, or the like.

Further measures which improve the invention are indicated in the subclaims or will appear in the following description of sample embodiments of the invention, which are shown schematically in the figures. The same reference symbols are used for the same or similar parts or features. Features or parts of different embodiments can be combined to obtain further embodiments. All features and/or advantages emerging from the claims of the specification or drawings, including design details, spatial arrangement, and steps of the method, can be essential to the invention in themselves as well as in the most diverse combinations.

Figure 2:
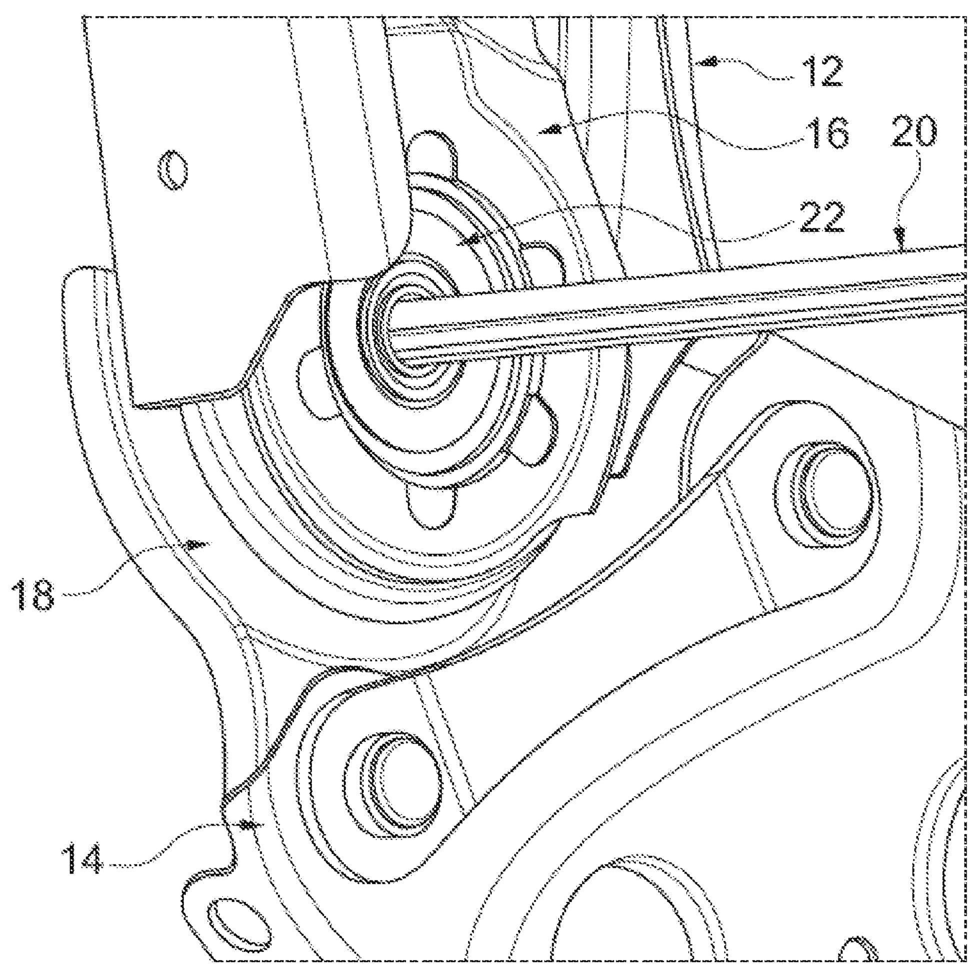
Figure 3:
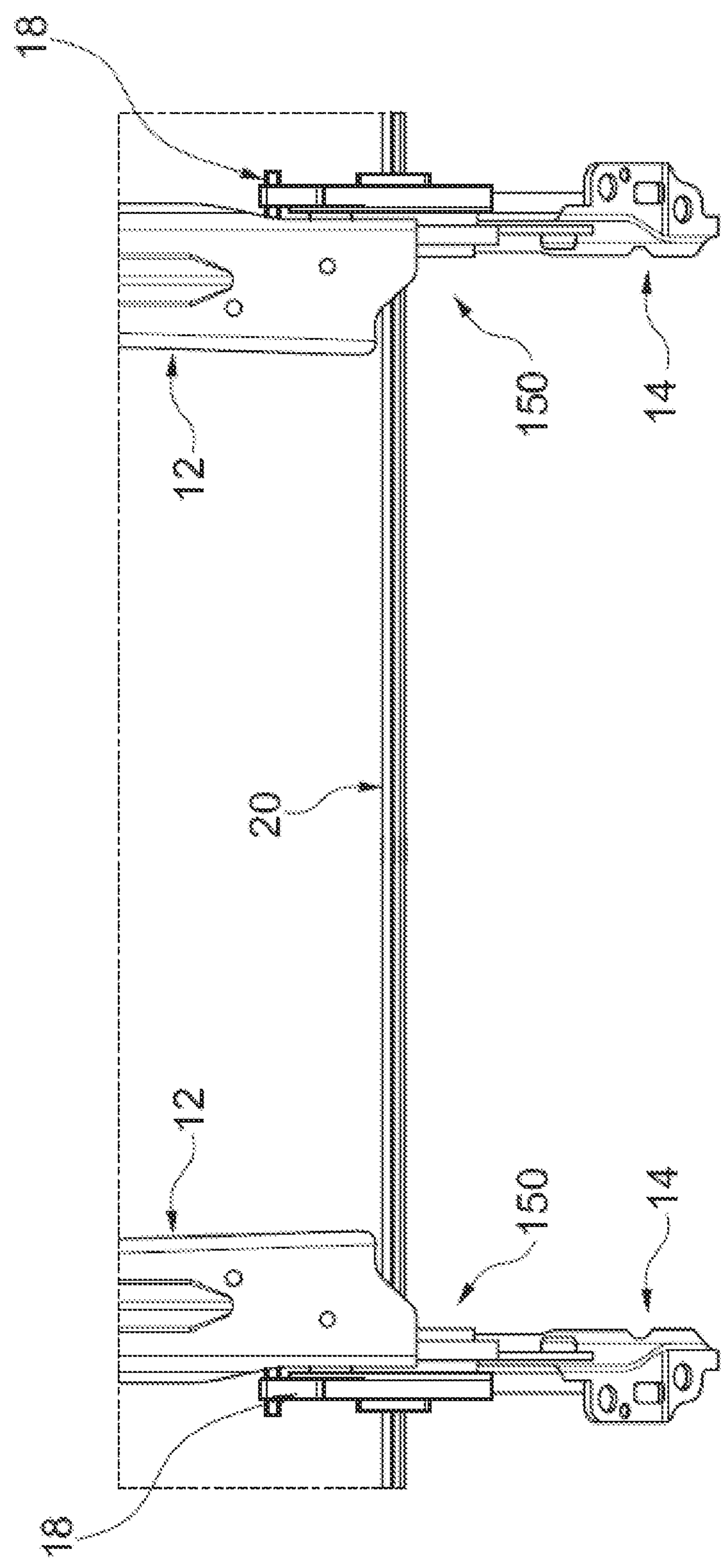
Figure 4:
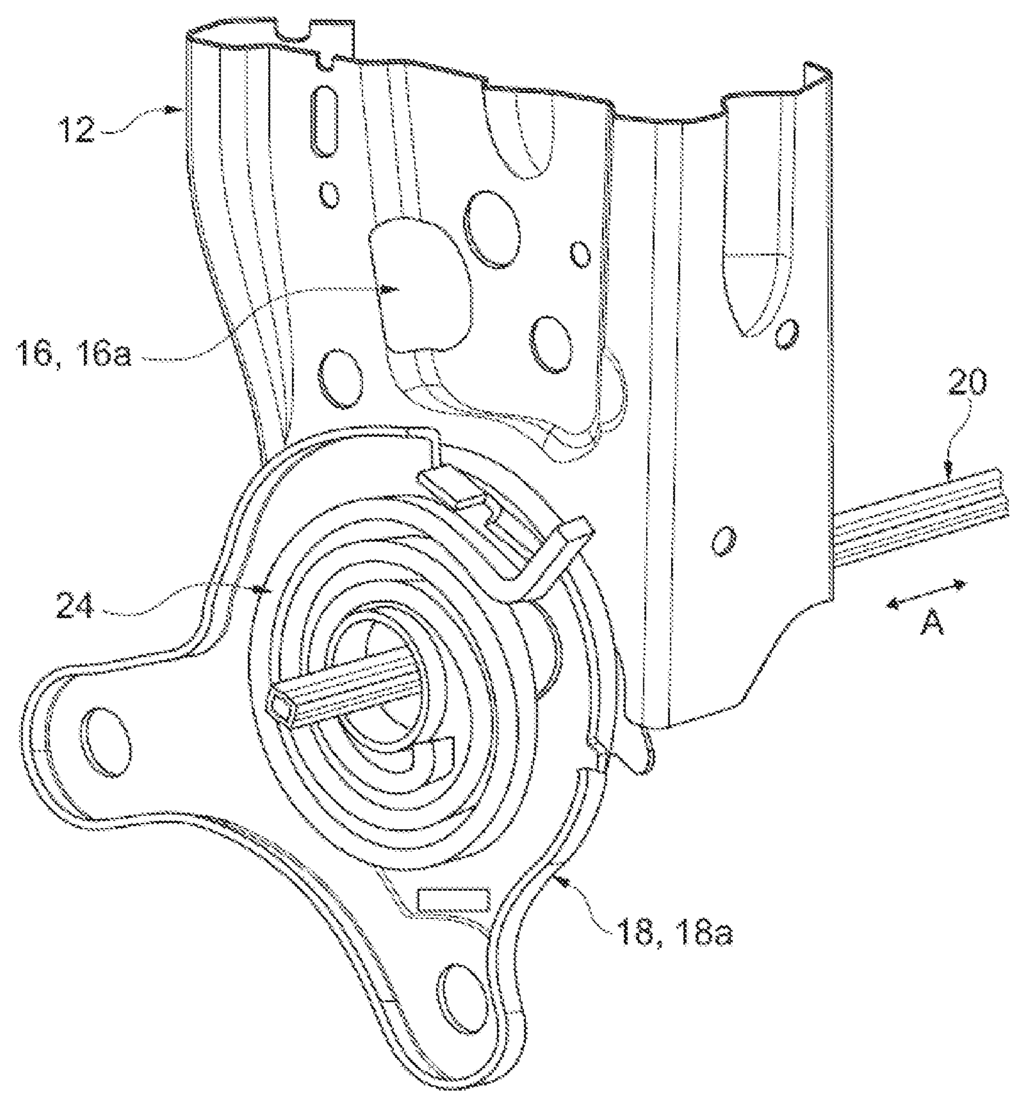
Figure 5:
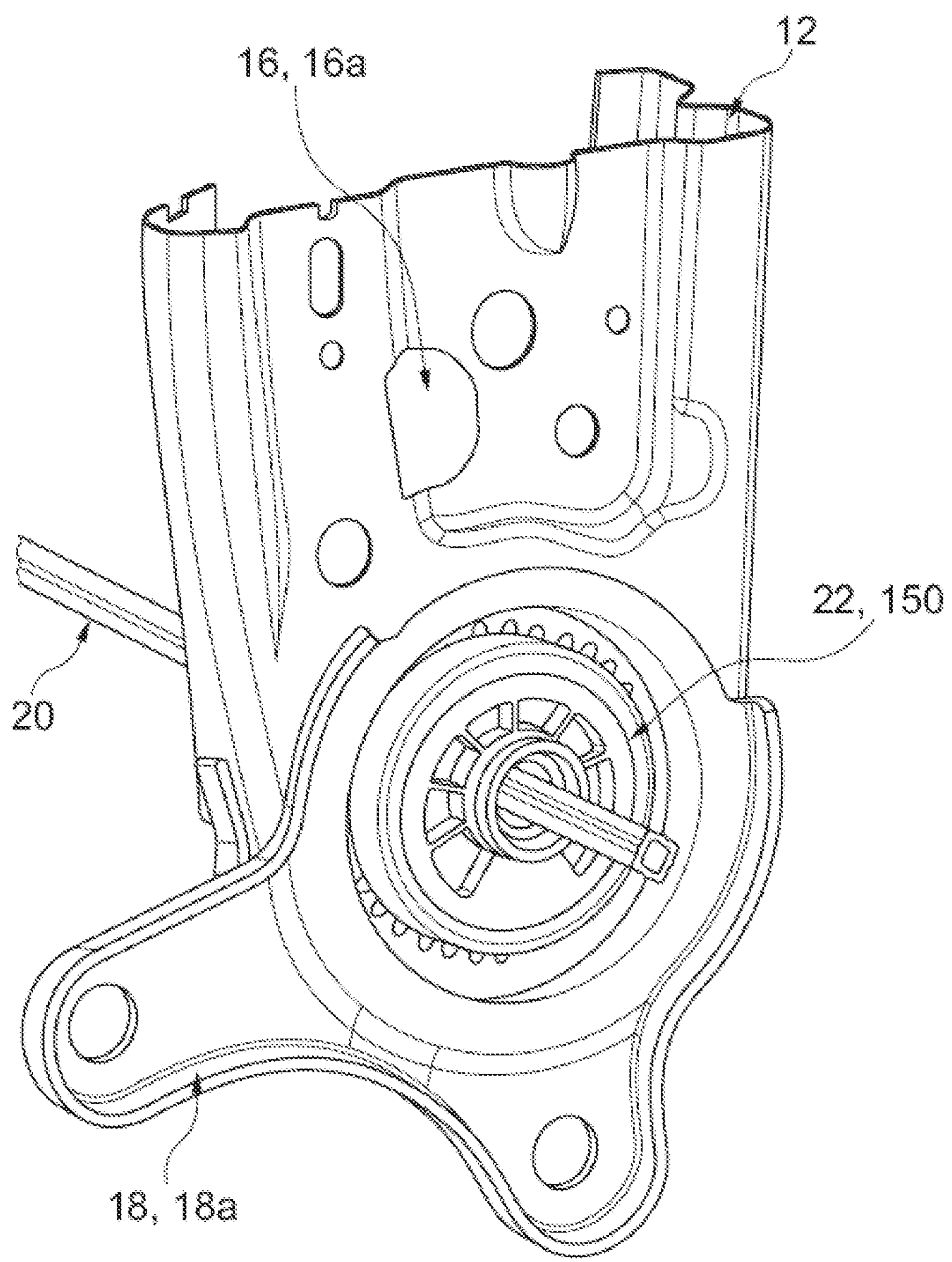
Figure 6:
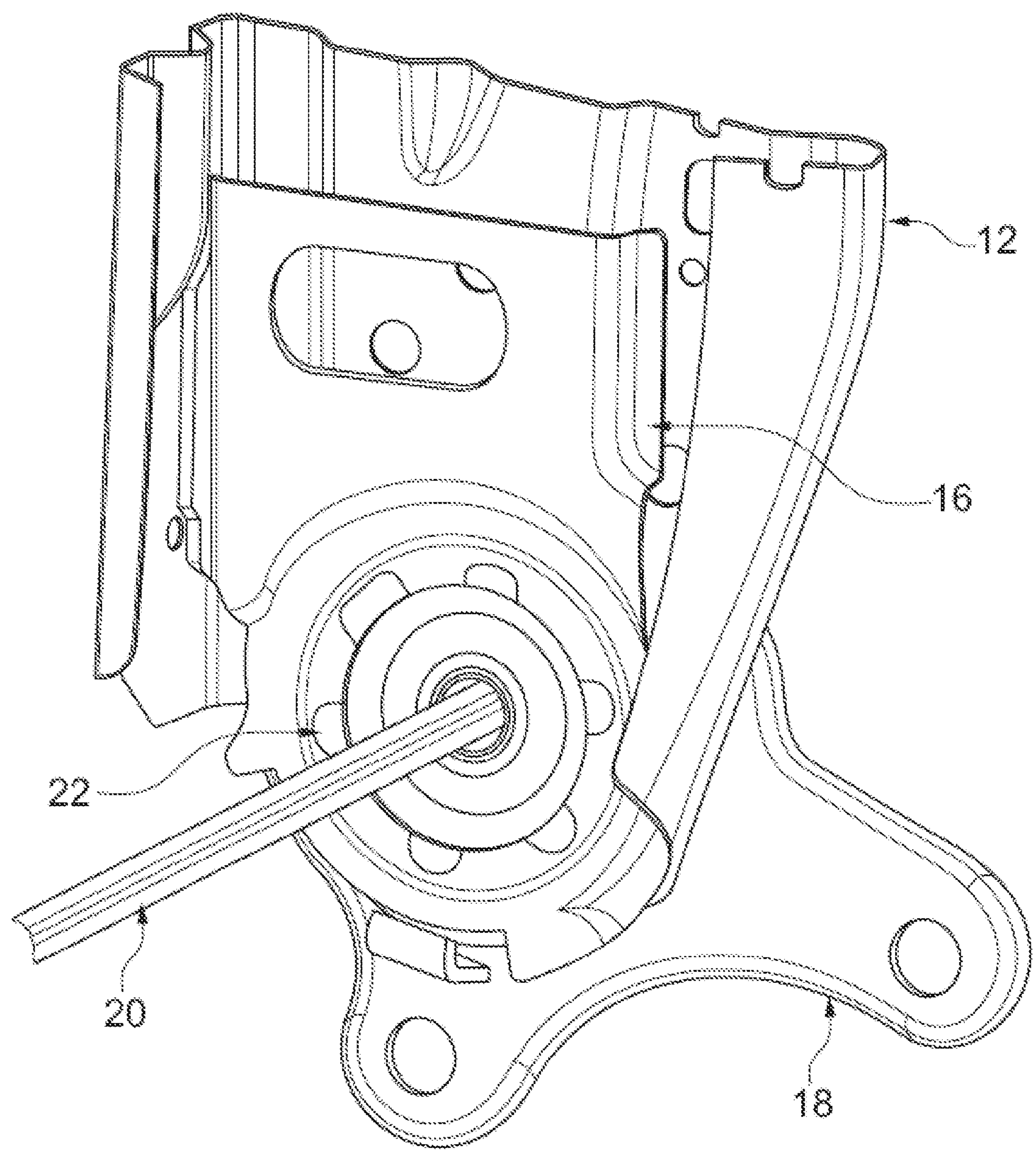
Figure 7:
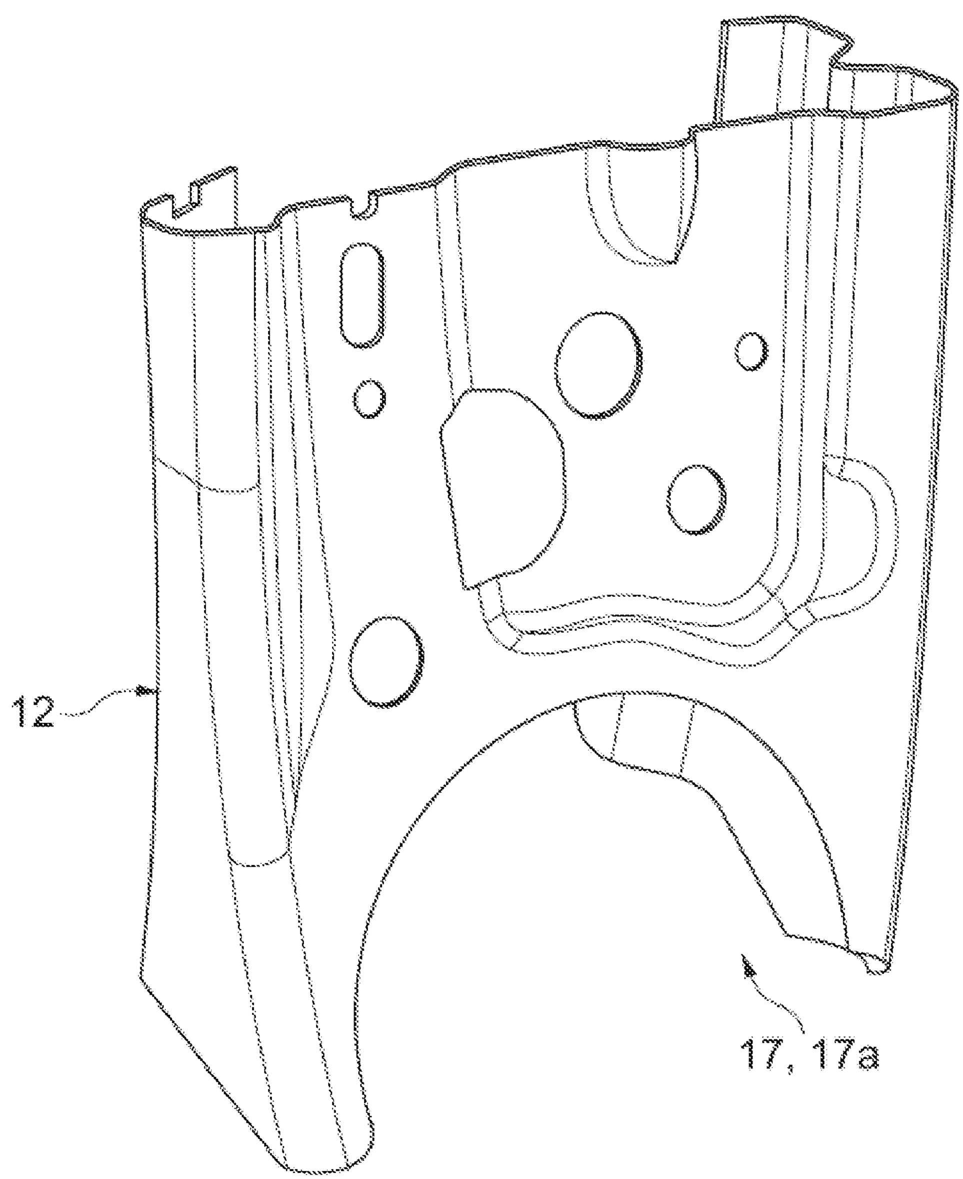
Figure 8:
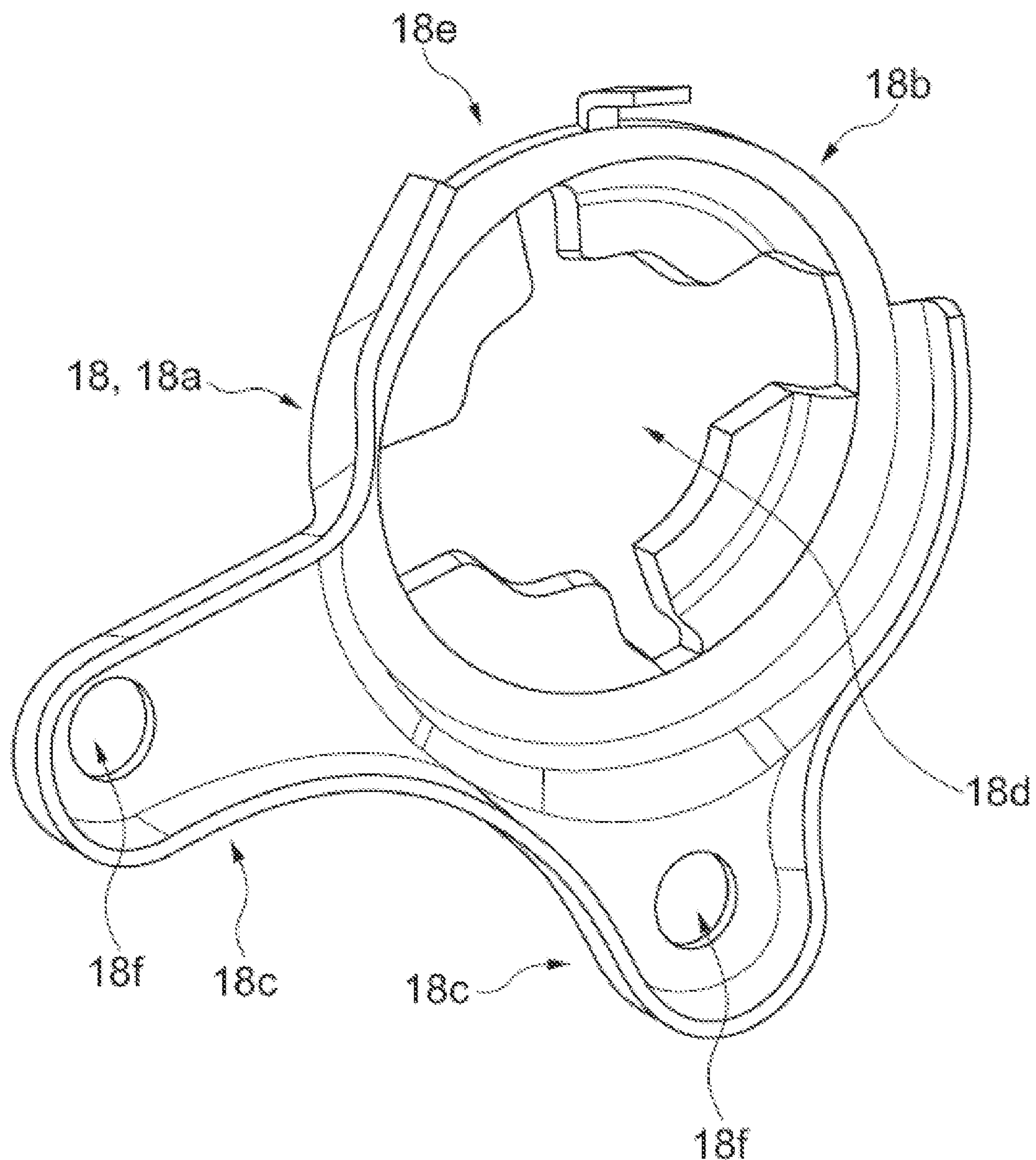
Figure 9:
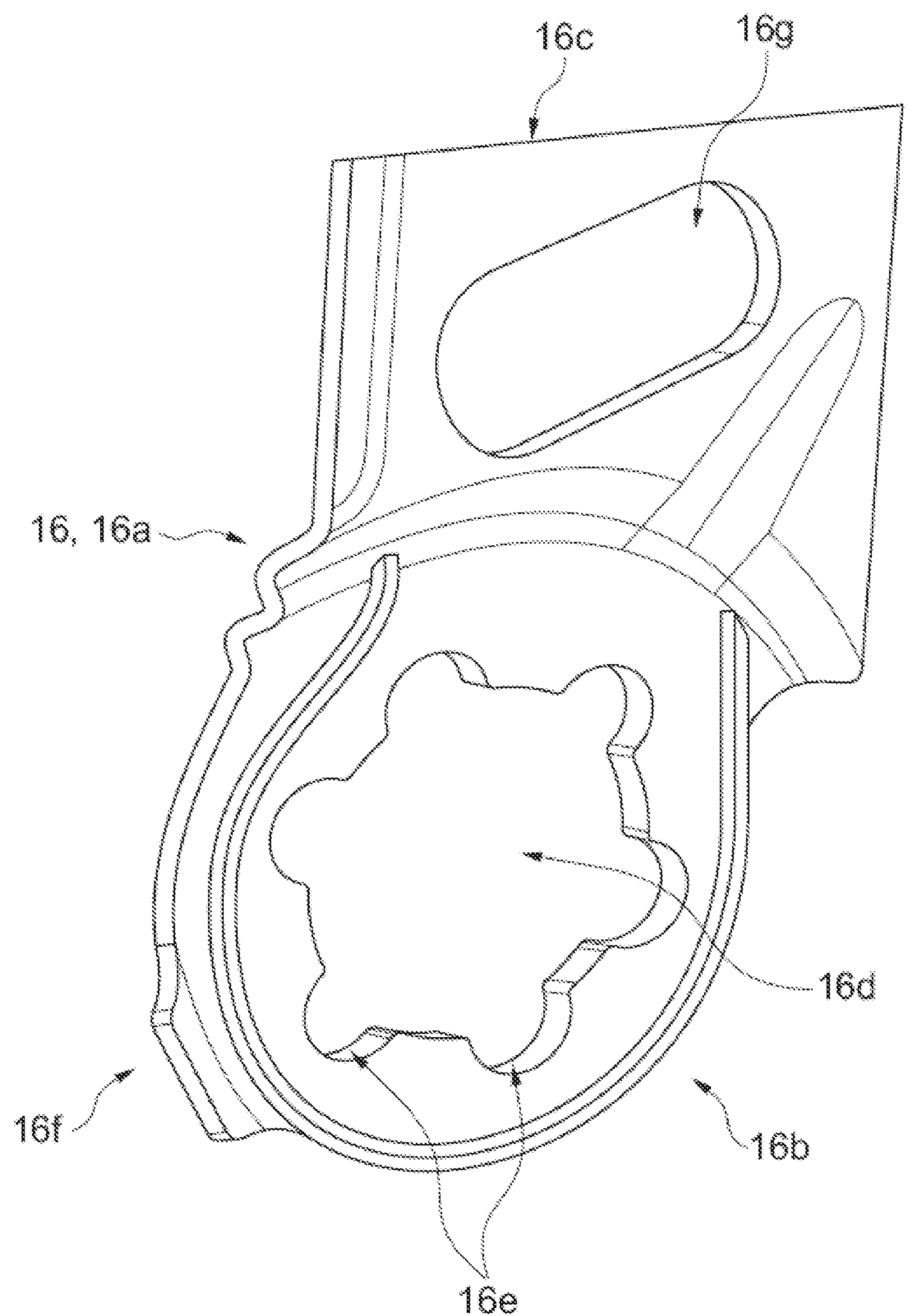
Figure 10:
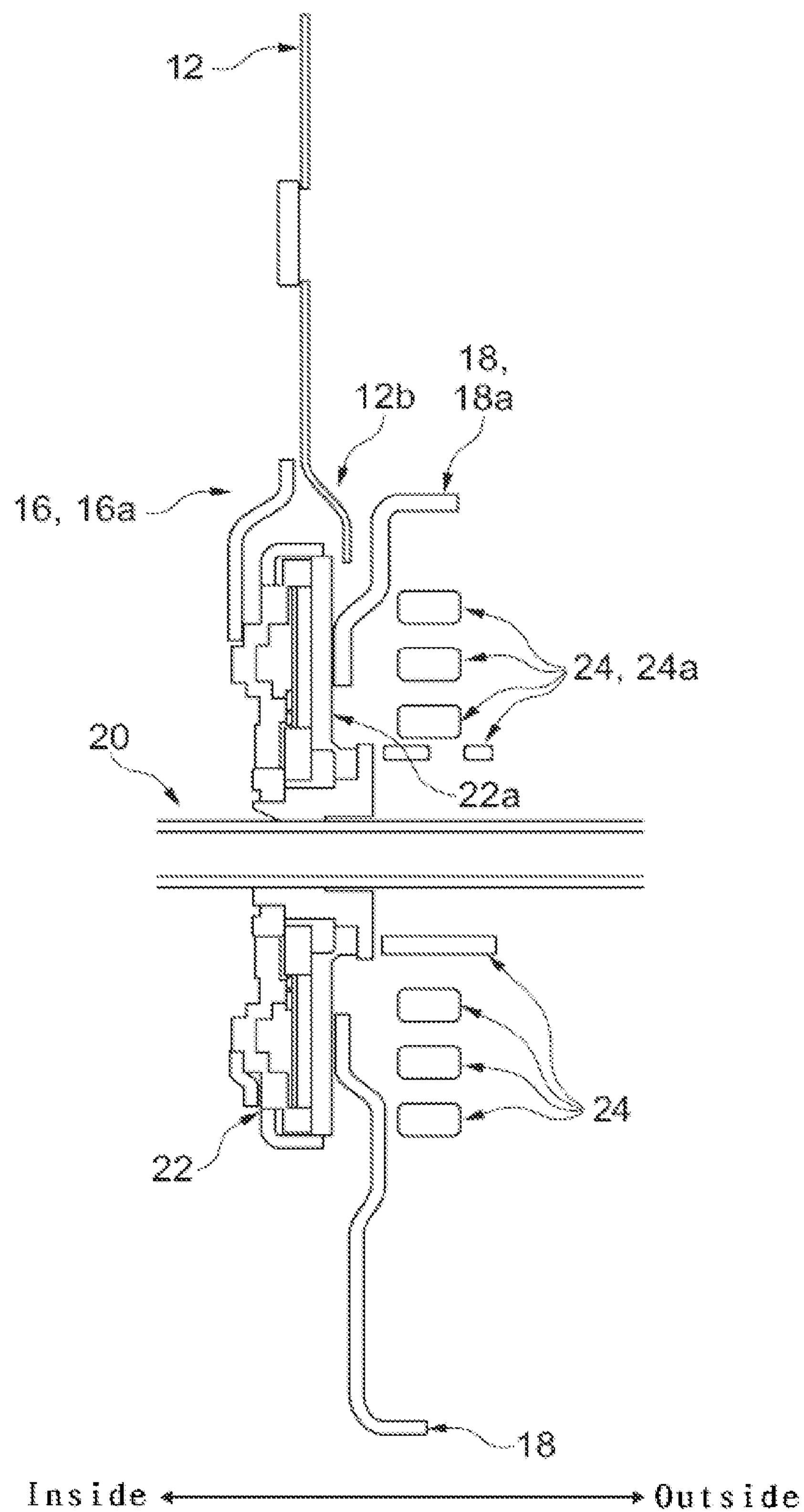
Figure 11:
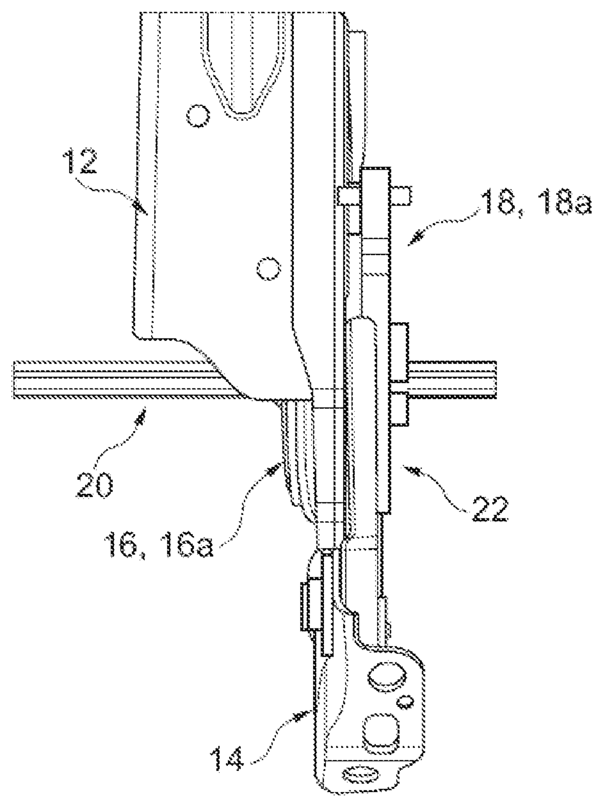
Figure 12:
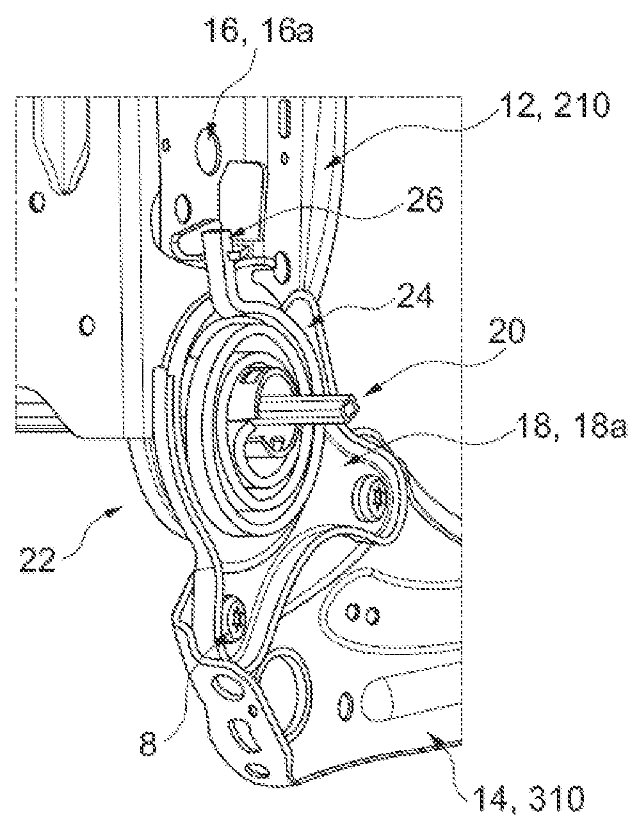
Figure 13:
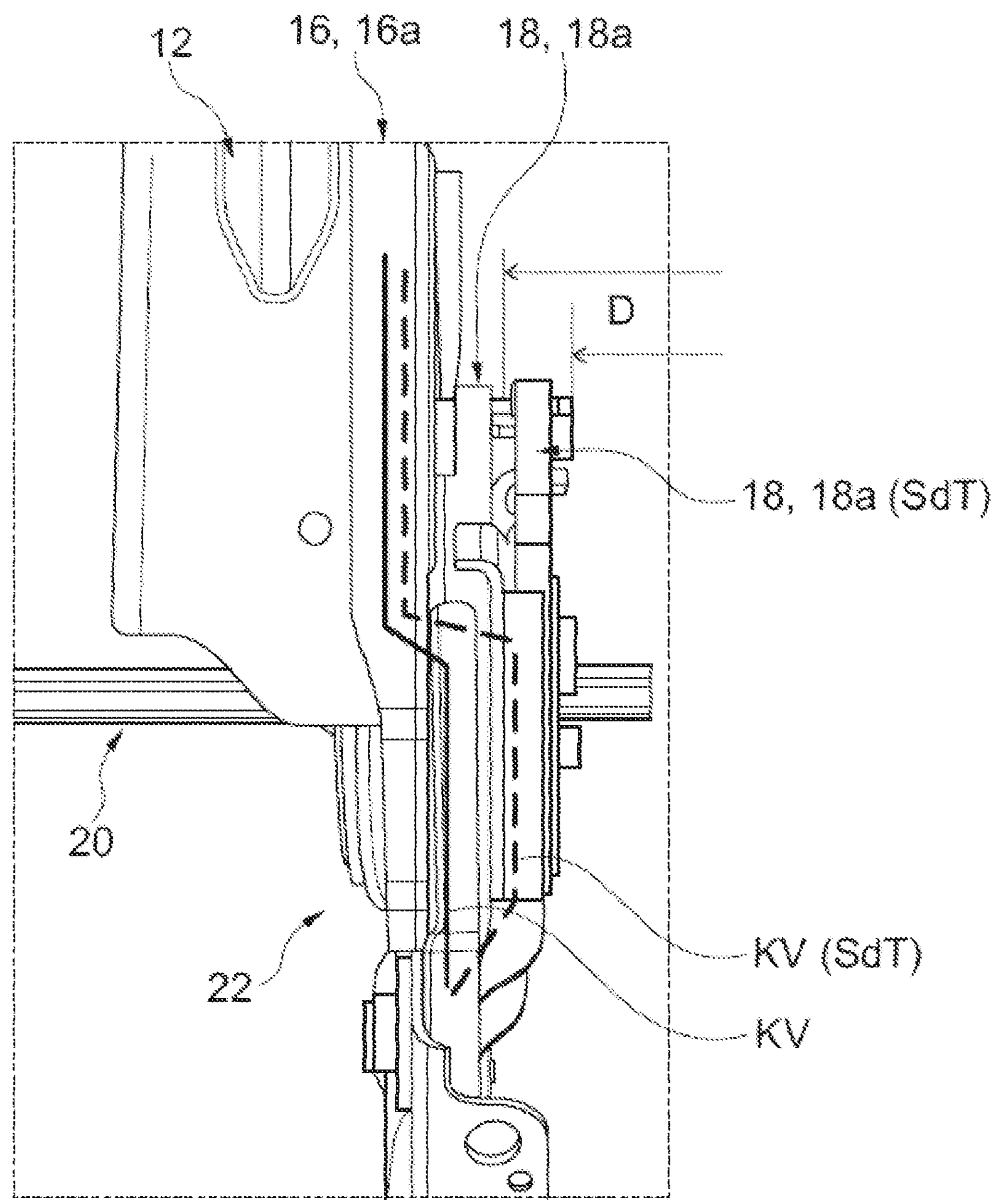

There are shown:

FIG. 1 schematically in a perspective view, a portion of a support structure of a motor vehicle seat with an adjustment device with locking mechanisms, FIG. 2 schematically in another perspective view, the part from FIG. 1, FIG. 3 schematically in a front view a larger portion of FIG. 1 with two adjustable fitting devices, FIG. 4 schematically in another perspective view the part from FIG. 1 without seat structure, FIG. 5 schematically another perspective view of the cutout from FIG. 4 with another embodiment of the adjustable fitting device, FIG. 6 schematically in another perspective view the cutout from FIG. 2, FIG. 7 schematically in a perspective view a cutout of a backrest longitudinal bracing with holder, FIG. 8 schematically in a perspective view a seat section of the adjustment device, FIG. 9 schematically in a perspective view a backrest section of the adjustment device, FIG. 10 schematically in a cross section view a cutout of the motor vehicle seat in the region of the adjustment device, FIG. 11 schematically in another perspective view the cutout from FIG. 10, FIG. 12 schematically in another perspective view the cutout from FIG. 11 and FIG. 13 schematically in a perspective view a comparison of an embodiment according to the invention and the prior art in a rear view.

FIGS. 1 to 13 show in different views and different degrees of detail various embodiments of a motor vehicle seat 10 with an adjustment device 100 according to the invention.

The adjustment device 100 connects a backrest piece, a backrest or more generally a backrest structure 210 of the motor vehicle seat 10 to a seat piece or more generally a seat structure 310 of the motor vehicle seat 10. Of the backrest structure 210 and the seat structure 310, there is shown here only the supporting structure, that is, cushion and other components of the motor vehicle seat are left out as not being relevant to the invention. The backrest structure 210 and the seat structure 310 here are joined to each other in folding manner by the adjustment device 100. The backrest structure 210 has two backrest (partial) sections spaced apart parallel and at the side, the backrest longitudinal bracings 12, only one of which is shown here. The seat structure 310 has a seat longitudinal bracing 14. The backrest longitudinal bracings 12 or also frame part are coupled to the adjustment device 100. In the embodiment shown here, the backrest sections and backrest longitudinal bracings 12 are connected to the adjustment device 100 via backrest sections 16, here being the adapter elements, the backrest adapter elements, upper adapter elements or backrest adapters **16*a* (brackets), which shall be described below in greater detail. The seat piece or the seat structure 310 is connected to the adjustment device 100 correspondingly at each partial seat section with a seat section 18, which are configured here as seat adapter element, lower adapter element or seat adapter 18*a* (bracket). The adapter elements 16 and 18 form an adapter unit. On each side, especially the axial side, the adjustment device 100 has a locking mechanism 110. In the present case, the locking mechanisms 110** are mirror images of each other, but otherwise have an identical design.

The Locking mechanisms 110 each comprise two adjustable fitting devices or in short adjustable fittings 150, which engage with each other when blocked by the locking mechanisms 110 and accordingly are not engaged for a releasing of the locking mechanisms 110. A detailed description of the adjustment device 100 and the locking mechanism 110 will follow below. The same or similar parts are designated with the same reference symbols. A detailed description of parts already described is omitted for reasons of better clarity.

FIG. 1 shows schematically in a perspective view a portion of the supporting structure of the motor vehicle seat 10 with the adjustment device 100 with the locking mechanism 110. Only one of the two laterally spaced locking mechanisms 110 is shown here, being mirror images of each other but otherwise identical in design. In order to activate both locking mechanisms 110 jointly by a common activating unit or operating unit and thus activate the overall adjustment device 100 by a common operating unit, the two locking mechanisms 110 are coupled together, which is only shown roughly here for reasons of clarity. The coupling of the two locking mechanisms 110 is done by a common transmission unit 20, which in the present case is shown as a rotary axis, a connecting rod, or a rotary shaft. The transmission unit 20 per FIG. 1 is designed as a hollow shaft with a rotationally symmetrical cross section, here configured as a hollow profiled rectangular cross section. This sticks out to the side beyond the two adjustable fittings 150, so that an operating unit can be arranged each time on the outside, that is, on the projecting part. The adjustable fitting 150 has an adjustable fitting mechanism 22, which enables a locking and releasing of the folding action of the backrest structure 210 to the seat structure 310. The adjustable fitting mechanism 22 comprises a first adjustable fitting part and a second adjustable fitting part, which cooperate with each other, that is, can engage with each other and can be separated. Furthermore, the adjustable fitting mechanism 22 has a spring mechanism 24 for applying the spring force to the backrest structure 210, either directly or via the backrest section 16. In the sample embodiment of FIG. 1, the spring mechanism 24 is designed as a torsion spring or spiral spring **24*a*, in order to realize a space-saving design. Here, the spiral spring 24*a* is arranged with one free end on the backrest longitudinal bracing 12 across a connection means 26. Furthermore, the adjustable fitting mechanism 22 comprises a gearing unit, not otherwise shown here, such as a gearwork or the like. The seat section 18, more precisely the seat adapter 18*a*, is fixed firmly by two screw connections 8 to the seat structure 310. By another end the spiral spring 24*a* is secured to the seat adapter 18*a*, so that the seat adapter 18*a* serves as an abutment for the spiral spring 24*a*. The seat adapter 18*a* according to FIG. 1 is arranged on an outer side of the backrest longitudinal bracing 12 or the seat structure 310 and/or the backrest structure 210. The backrest adapter 16*a*, here only approximately noticeable, since it is covered by the backrest longitudinal bracing 12, is arranged on one inner side of the backrest longitudinal bracing 12, that is, on one inner side of the backrest structure 210 and/or the seat structure 310. The backrest section 16 and the seat section 18 are arranged with an axial spacing from each other and form a sandwich structure with the backrest longitudinal bracing 12 in between. The arrangement of the backrest section 16 is distinctly seen in FIG. 2**.

FIG. 2 shows schematically in another perspective view the portion from FIG. 1. The same or similar parts are given the same reference numbers. A detailed description of parts already described will not be done, for reasons of clarity. The perspective view runs from the direction of an inner side to the inner side of the backrest longitudinal bracing 12. The backrest section 16 is welded to the inner side of the backrest longitudinal bracing 12, so that a stationary fixing of the backrest section 16 to the backrest longitudinal bracing 12 is assured. Arranged at an axial spacing from this and separated by the backrest longitudinal bracing 12 is the seat section 18. The seat section 18 is coupled by the adjustable fitting device 150, such as the transmission unit 20 or the adjustable fitting mechanism 22, to the backrest section 16. The backrest section 16 is able to move relative to the seat section 18, at least in an unlocked or released condition of the adjustment device 100, that is, when the parts of the adjustable fitting are not engaged.

FIG. 3 [shows] schematically in a front view a larger portion from FIG. 1 with two adjustable fitting devices 150. As a cutout view, the seat structure 310 and the backrest structure 210 are shown, each time with two longitudinal braces 12, 14. The seat sections 16 are both arranged on the inside or on an inner side, that is, between the two longitudinal braces 14, 12 (here, concealed by the backrest longitudinal bracings 12). The seat sections 14 are arranged on the outside, that is, on an outer side, of the longitudinal braces 12, 14. The two adjustable fitting devices 150 are joined together by the common transmission unit 20. In this way, the adjustable fitting devices can be released in synchronized manner.

FIG. 4 shows schematically in another perspective view the part from FIG. 1 without the seat structure 310. On the inside of the backrest longitudinal bracing 12 is arranged the backrest section 16 or the backrest adapter 16*a*. On the outside of the backrest longitudinal bracing 12 is arranged the seat section 18 or the seat adapter 18*a*. In the axial direction A between the seat adapter 18*a* and the backrest adapter 16*a* is arranged the backrest longitudinal bracing 12. The two adapters 16*a*, 18*a* here [are] arranged at a lower end of the backrest longitudinal bracing 12. The adjustable fitting mechanism 22 in FIG. 4 is designed as a discontinuous adjustable fitting mechanism 22 with a spiral spring 24*a*.

FIG. 5 shows schematically another perspective view of the cutout from FIG. 4 with another configuration of the adjustable fitting device 150. The adjustable fitting device 150 of FIG. 5 does not have a spiral spring 24*a*. Instead, the adjustable fitting mechanism 22 has a different gearing unit. Accordingly, the adjustable fitting mechanism 22 is designed as a continuous adjustable fitting mechanism 22 or the adjustable fitting device 150 is designed as a continuous adjustable fitting device 150. Otherwise, the design of the motor vehicle seat resembles the design presented in FIG. 1 to 4.

FIG. 6 shows schematically in another perspective view the cutout from FIG. 2. The arrangement of the backrest section 16 and the backrest adapter 16*a* on the inside of the backrest longitudinal bracing 12 is clearly noticeable here. By the adjustable fitting mechanism 22 including the transmission unit 20, the backrest section 16 is connected to the axially spaced seat section 18 by the separating backrest longitudinal bracing 12. For this, the backrest longitudinal bracing 12 has a corresponding design, which is described in detail in FIG. 7.

FIG. 7 shows schematically in a perspective view a cutout of the backrest longitudinal bracing 12 with a holder 17 for the adjustment device 100. The holder 17 is adapted to the outer contour of the corresponding region of the adjustment device 100 being accommodated. At one end, the holder is against the backrest longitudinal bracing 12. The holder is in the form of a through opening 17*a* through the wall of the backrest longitudinal bracing 12. The through opening 17*a* is roughly semicircular in cross section, so that the holder 17 partially encloses the corresponding region of the adjustment device 100. The configuration of the seat section 18 and the backrest section 16 is apparent from the following description.

FIG. 8 shows schematically in a perspective view the seat section 18 of the adjustment device 100. The seat section 18 is configured as a seat adapter 18*a*. The seat adapter 18*a* has a central body 18*b* with two arms 18*c* protruding radially from it. The central body 18*b* has a through opening 18*d*, roughly in cross shape. The seat adapter 18*a* has an outer shoulder 18*e*, whose outer contour has a roughly circular or annular cross section. Thus, the outer contour is adapted to the holder 17 and vice versa. The arms likewise have through openings 18*f* at their ends, which are designed for a screw or rivet connection to the seat structure 310. Thanks to the through opening 18*d*, a coupling to the adjustable fitting mechanism 22 is made possible.

FIG. 9 shows schematically in a perspective view the backrest section 16 of the adjustment device 100. The backrest section 16 is designed as a backrest adapter 16*a* and comprises a central body 16*b* with a radially protruding extension 16*c*. The central body 16*b* has a central through opening 16*d*. At the margin of the circular through opening 16*d* there are radial recesses 16*e*. Thanks to the through opening and the recesses 16*e*, a connection to the adjustable fitting mechanism 22 is made possible. Thanks to the projection 16*c*, a connection to the backrest longitudinal bracing 12 is made possible. For a connection to and/or arrangement on or in the holder 17, an axial offset or shoulder 16*f* is provided. Moreover, an oblong hole 16*g* is provided in the extension 16*c*, so that a simple connection can be realized.

FIG. 10 shows schematically in a cross sectional view a cutout of the motor vehicle seat 10 in the region of the adjustment device 100. The following parts are shown from top to bottom. On the backrest longitudinal bracing 12, which is designed as a thin-wall sheet metal part, on its inside, there is secured at the side the seat section 16 in the form of the seat adapter 16*a*, in the present case by means of welding. Partly enclosed by the shoulder 16*f* of the seat adapter is the adjustable fitting mechanism 22. On the outside of the backrest longitudinal bracing 12 is arranged the seat section 18. Against the shoulder 18*e* of the seat section lies the backrest longitudinal bracing 12 by a shoulder 12*b*. Enclosed by the seat adapter 18*a* is the spring mechanism 24, fashioned as a spiral spring 24*a*. The through openings of the seat adapter 18*a* and the backrest adapter 16*a* are arranged roughly concentric to each other and around the transmission unit, designed as a rotary axis. The transmission unit passes through the seat adapter 18*a*, the center of the spiral spring 24*a*, the adjustable fitting mechanism 22, the backrest longitudinal bracing 12, more precisely its holder 17, and the backrest adapter 16. The seat adapter 18*a* is connected to the detent part 22*a* of the adjustable fitting mechanism 22. Since the adjustable fitting mechanism 22 is basically known, no more detailed description of it shall be provided.

FIG. 11 shows schematically in another perspective view the cutout from FIG. 10. One clearly sees how the seat section 18 or the seat adapter 18*a* is arranged on the outside of the backrest longitudinal bracing 12. The backrest section 16 is concealed by the backrest longitudinal bracing 12. The transmission unit 20 extends in the axial direction A. The backrest longitudinal bracing 12 terminates around the height of the transmission unit in the radial direction. Arranged radially about the transmission unit 20 are the adjustable fitting mechanism 22, the seat adapter 18 and the backrest adapter 16. By the holder 17, the backrest longitudinal bracing 12 partially encloses the adapters 16, 18 and the mechanism 22.

FIG. 12 shows schematically in another perspective view the cutout from FIG. 11. The cutout is viewed from the outside. The backrest adapter 16*a* is partly visible through recesses on the backrest longitudinal bracing 12. The seat adapter 18*a* is fixed firmly by a screw connection 8 to the seat structure, more precisely, the seat longitudinal bracing 14. By the adjustable fitting mechanism 22, the seat section 18 is coupled to the backrest section 16 and able to move relative to it. The backrest structure 210 is connected by the adjustable fitting device 150 to the seat structure 310 and able to turn about the transmission unit 150. The spiral spring 24*a* is secured by an inner end to the adjustable fitting mechanism 22. By its free end the spiral spring 24*a* is secured via connection means 26 to the backrest longitudinal bracing 12 and thus applies a spring force to it.

FIG. 13 shows schematically in a perspective view a comparison between a design according to the invention and the prior art in a rear view. The side distance achieved as compared to the prior art is indicated as D. Because the backrest adapter 16 is arranged on an inner side, the exterior part of the adjustment device is no longer so large. Here, the axial distance D, thanks to being arranged on the inside, is around 10 mm. For a better comparison, the position of the seat adapter according to the prior art is shown as 18 (SdT). One clearly sees that the arrangement of the seat adapter according to the invention saves a distinct distance D in the axial direction. Besides the axial distance D, a more favorable flow of force is also realized. KV (SdT) designates the flow of force according to the prior art. KV designates the flow of force according to the invention. The flow of force according to the invention runs essentially closer along the backrest longitudinal bracing 12, i.e., in the middle between the seat adapter 18*a* and the backrest adapter 16*a*. In the prior art, the flow of force is distinctly further out from the middle, since both seat adapter 18*a* and backrest adapter 16 run at the side outside of the backrest longitudinal bracing 12. For better visibility, the backrest adapter 16*a* is shown through the backrest longitudinal bracing 12.

LIST OF REFERENCE SYMBOLS

8 Screw connection
10 Motor vehicle seat
12 Backrest longitudinal bracing
14 Seat longitudinal bracing
16 Backrest section
16*a* Backrest adapter
16*b* Body
16*c* Extension
16*d* Through opening
16*e* Recess
16*f* Shoulder
16*f* Oblong hole
17 Holder
17*a* Through opening
18 Seat section
18 (SdT) Seat section (prior art)
18*a* Seat adapter
18*a* (SdT) Seat adapter (prior art)
18*b* Body
18*c* Arm
18*d* Through opening
18*e* Shoulder
18*f* Through opening
20 Transmission unit
22 Adjustable fitting mechanism
24 Spring mechanism
26 Connection means
24*a* Spiral spring
26 Connection means
100 Adjustment device
110 Locking mechanism
150 Adjustable fitting (device)
210 Backrest structure
310 Seat structure
A Axial direction
D (Axial) distance
KV Flow of force
KV (SdT) Flow of force (prior art)

The invention claimed is:

1. A vehicle seat having a left side structure and a right side structure, where an axial direction is defined as being oriented transversely between the left and right side structures, said seat comprising:
in each of the left side structure and the right side structure:
a backrest longitudinal bracing defining one side of a backrest structure;
a seat longitudinal bracing defining one side of a seat structure; and
an adjustment device pivotably coupling the backrest structure to the seat structure, said adjustment device including a backrest section bracket fixed to the backrest longitudinal bracing and a seat section bracket fixed to the seat longitudinal bracing,
where the backrest section bracket and the seat section bracket are pivotably coupled together allowing pivoting about the axial direction,
and the backrest section bracket and the seat section bracket each include an offset in the axial direction defining an axial space between the backrest section bracket and the seat section bracket,
and the backrest longitudinal bracing and seat longitudinal bracing are positioned between the backrest section bracket and the seat section bracket in the axial space defined by the offsets.

2. The vehicle seat according to claim 1 wherein the seat structure is coupled to a vehicle body floor.

3. The vehicle seat according to claim 1 further comprising, in each of the left side structure and the right side structure, a locking mechanism operatively coupled to the backrest section bracket and the seat section bracket of the adjustment device, said locking mechanism selectively locking and unlocking pivotal movement of the backrest section bracket relative to the seat section bracket.

4. The vehicle seat according to claim 3 further comprising, in each of the left side structure and the right side structure, a spiral spring coupled to the backrest section bracket and the seat section bracket, said spring providing a bias torque urging the backrest section bracket to pivot to an upward and forward position relative to the seat section bracket.

5. The vehicle seat according to claim 3 further comprising a transmission shaft operatively coupling the locking mechanism in the left side structure with the locking mechanism in the right side structure to enable both of the locking mechanisms to be simultaneously locked or unlocked.

6. The vehicle seat according to claim 5 wherein the locking mechanisms are actuated by a rotation of the transmission shaft about its axis.

7. The vehicle seat according to claim 1 wherein the seat section bracket is located outboard of the backrest section bracket relative to the seat.

8. The vehicle seat according to claim 1 wherein the seat section bracket is bolted to the seat longitudinal bracing and the backrest section bracket is welded to the backrest longitudinal bracing.

9. A vehicle seat hinge, said hinge comprising:
a backrest longitudinal bracing defining one side of a backrest structure of a vehicle seat;
a seat longitudinal bracing defining one side of a seat structure of the vehicle seat; and
an adjustment device pivotably coupling the backrest structure to the seat structure, said adjustment device including a backrest section bracket fixed to the backrest longitudinal bracing and a seat section bracket fixed to the seat longitudinal bracing, where the backrest section bracket and the seat section bracket are pivotably coupled together allowing pivoting about an axial direction, and the backrest section bracket and the seat section bracket each include an offset in the axial direction defining an axial space between the backrest section bracket and the seat section bracket, and the backrest longitudinal bracing and seat longitudinal bracing are attached to the adjustment device at a position between the backrest section bracket and the seat section bracket in the axial space defined by the offsets.

10. The vehicle seat hinge according to claim 9 further comprising a spiral spring coupled to the backrest section bracket and the seat section bracket, said spring providing a bias torque urging the backrest section bracket to pivot to an upward and forward position relative to the seat section bracket.

11. The vehicle seat hinge according to claim 9 further comprising a locking mechanism operatively coupled to the backrest section bracket and the seat section bracket of the adjustment device, said locking mechanism selectively locking and unlocking pivotal movement of the backrest section bracket relative to the seat section bracket.

12. The vehicle seat hinge according to claim 11 further comprising a transmission shaft operatively coupling the locking mechanism in one side of the vehicle seat with a locking mechanism in the other side of the vehicle seat to enable both of the locking mechanisms to be simultaneously locked or unlocked.

13. The vehicle seat hinge according to claim 12 wherein the locking mechanisms are actuated by a rotation of the transmission shaft about its axis.

14. The vehicle seat hinge according to claim 9 wherein the backrest section bracket is welded to the backrest longitudinal bracing.

15. The vehicle seat hinge according to claim 9 wherein the seat section bracket is bolted to the seat longitudinal bracing.

16. A method for making a vehicle seat, said seat having a left side structure and a right side structure, where an axial direction is defined between the left and right side structures, said method comprising:

in each of the left side structure and the right side structure:

providing a backrest longitudinal bracing defining one side of a backrest structure;

providing a seat longitudinal bracing defining one side of a seat structure;

providing an adjustment device adapted to pivotably couple the backrest structure to the seat structure, said adjustment device including a backrest section bracket and a seat section bracket pivotably coupled together allowing pivoting about the axial direction, where the backrest section bracket and the seat section bracket each include an offset in the axial direction defining an axial space between the backrest section bracket and the seat section bracket;

welding the backrest longitudinal bracing to the backrest section bracket; and bolting the seat longitudinal bracing to the seat section bracket, where the backrest longitudinal bracing and seat longitudinal bracing are positioned between the backrest section bracket and the seat section bracket in the axial space defined by the offsets.

17. The method according to claim 16 further comprising, in each of the left side structure and the right side structure, installing a spiral spring coupled to the backrest section bracket and the seat section bracket, said spring providing a bias torque urging the backrest section bracket to pivot to an upward and forward position relative to the seat section bracket.

18. The method according to claim 16 further comprising, in each of the left side structure and the right side structure, installing a locking mechanism operatively coupling the backrest section bracket and the seat section bracket of the adjustment device, said locking mechanism selectively locking and unlocking pivotal movement of the backrest section bracket relative to the seat section bracket.

19. The method according to claim 18 further comprising installing a transmission shaft operatively coupling the locking mechanism in the left side structure with the locking mechanism in the right side structure to enable both of the locking mechanisms to be simultaneously locked or unlocked.

20. The method according to claim 19 wherein the locking mechanisms are actuated by a rotation of the transmission shaft about its axis.

* * * * *